G. D. PEARSON.
WIND MOTOR.
APPLICATION FILED APR. 8, 1911.
1,027,501.
Patented May 28, 1912.
2 SHEETS—SHEET 2.
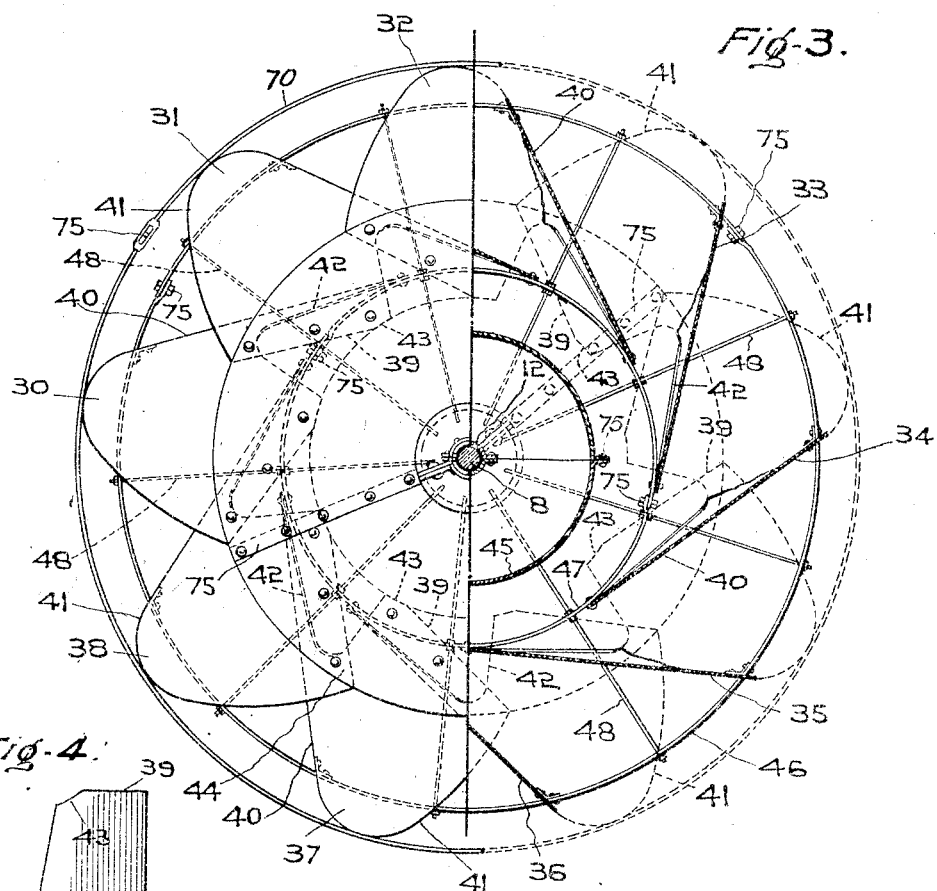
Fig-3.
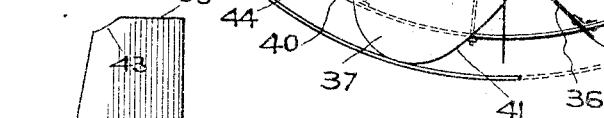
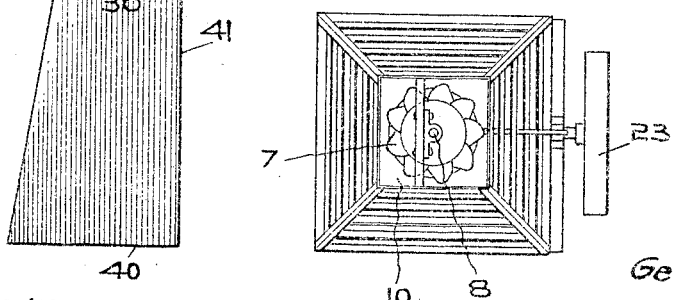
Fig-4.
Fig-5.
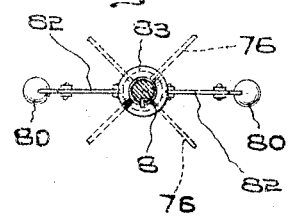
Fig-6.
Witnesses.
George D. Pearson.
Inventor.
per Attorney.

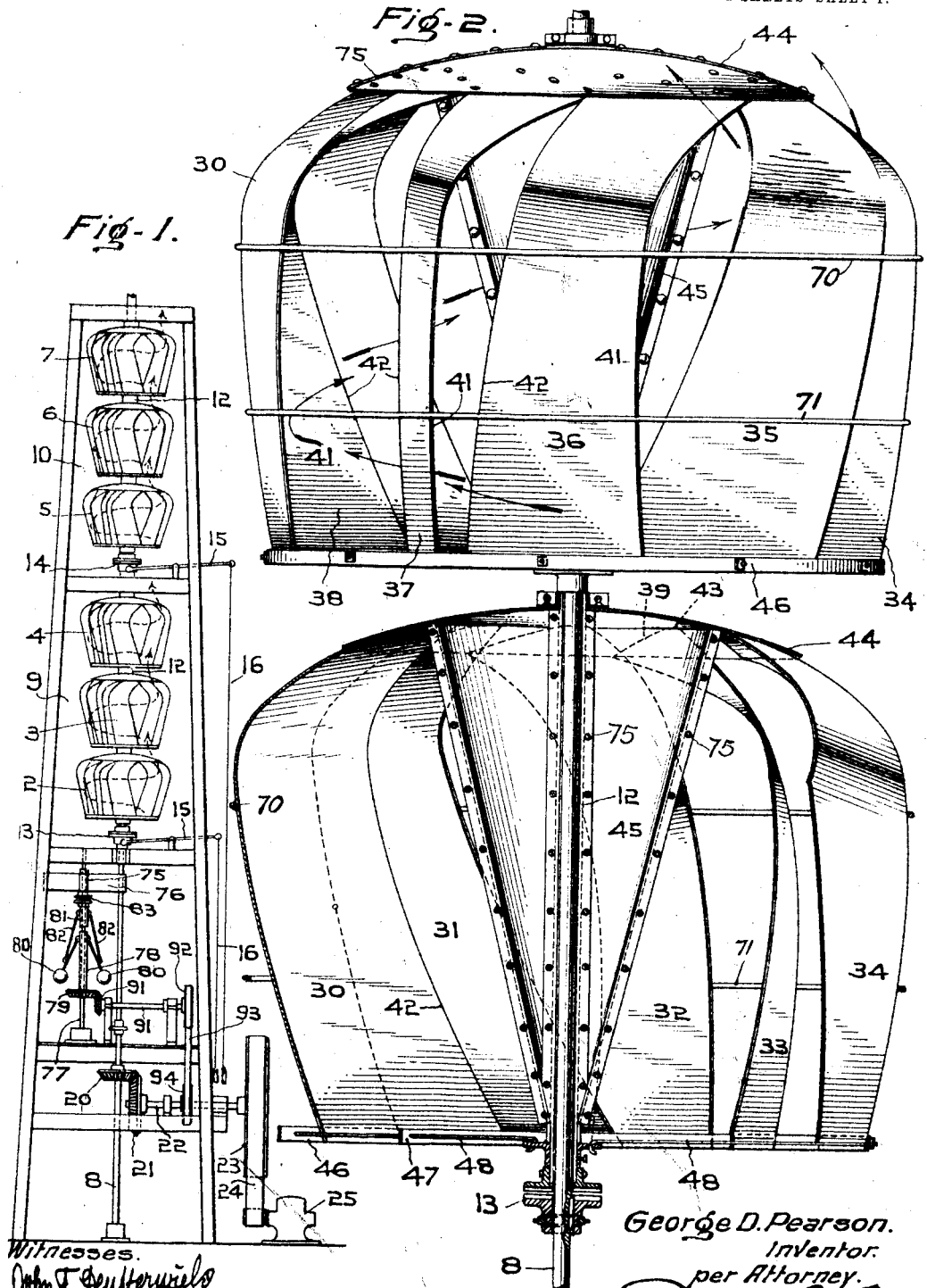

UNITED STATES PATENT OFFICE.

GEORGE D. PEARSON, OF MONTREAL, QUEBEC, CANADA.

WIND-MOTOR.

1,027,501.   Specification of Letters Patent.   Patented May 28, 1912.

Application filed April 8, 1911. Serial No. 619,769.

*To all whom it may concern:*

Be it known that I, GEORGE D. PEARSON, residing at Montreal, in the Province of Quebec, Dominion of Canada, have invented certain new and useful Improvements in Wind-Motors, of which the following is a specification.

My invention has for its object to provide a motor adapted to, firstly, utilize the power of the wind exerted as usual as side load thereon, and, secondly, to change the direction of the wind currents within the motor with the effect of concentrating what would otherwise be lost force and developing additional power to be delivered with the power developed from the side load, as available torque.

To this end my invention may be said, broadly, to consist of a wind motor of the turbine type having a core of inverted conical form and its vanes of slightly spiral form, tangentially arranged their main length diverging from the bottom upward substantially in coincidence with the core while their upper ends are turned sharply inwardly to the base of the cone.

For full comprehension however of the motor reference must be had to the accompanying drawings forming a part of this specification, in which similar reference characters indicate the same parts and wherein:

Figure 1 is an elevation of my improved motor; Fig. 2 is a part side elevation and part vertical sectional view of two elements of the motor; Fig. 3 is a part plan view and part horizontal sectional view of one element of my improved motor; Fig. 4 is a plan view of one of the blades; Fig. 5 is a plan view of the motor as illustrated in Fig. 1. Fig. 6 is a horizontal sectional view of the governor.

The preferred embodiment of my invention comprises a vertical series of turbines 2, 3, 4, 5, 6 and 7 arranged in axial alinement and supported by a main vertical shaft 8, such series being divided into two batteries 9 and 10 mounted on separate tubular shafts 12 rotatably carried on the main shaft and operatively connected thereto by a pair of clutches 13 and 14 operated from the base by levers 15 and pendant rods 16, power being transmitted from the shaft and distributed by means of bevel-gears 20, 21 a shaft 22, driving pulley 23, belt 24 and a dynamo 25, or other preferred transmission mechanism.

The turbines correspond in construction, and each consists of a series of blades 30, 31, 32, 33, 34, 35, 36, 37 and 38, each of slightly spiral form tangentially arranged and increasing in width from top to bottom edges 39 and 40 respectively, which are parallel, the radially outer edge 41 being at right angles to these top and bottom edges and the inner edge 42 inclined relatively thereto while the upper inner corner is sheared off as at 43. The upper ends of these blades are riveted or otherwise rigidly secured to an annular downwardly inclined flange 44 extending from the base of an inverted cone 45 and their lower ends are secured to and supported and braced by a circular spider-frame comprising a pair of annular bands or flat rings 46, 47 united and braced by a series of radial stays 48 secured at their inner ends to a flanged collar fixed upon the tubular shaft. The particular form and arrangement of these vanes with relation to each other and the cone is an important factor in the efficient operation of the motor, and are as follows:—The required spiral form and angular position of each vane relatively to the axis of the motor is obtained by arranging the inner end of the top edge and outer end of the lower edge in substantially radial alinement, the inner end of the top edge overreaching the line to a small extent (see Fig. 3) and disposing the upper edge at a slightly greater angle to the radial line than the bottom edge, while each vane is so curved in the direction of its length that the greatest diameter thereof is in a horizontal plane approximately three quarters distance from the bottom to the top of the turbine of which it forms a component part. Each turbine is positioned to place its vanes slightly in advance of the vanes of the turbine beneath it.

The velocity of the shaft 8 is controlled by a governor constructed preferably as follows:—A brake-wheel consisting of a hub 75 and a series of wide flat radial vanes or beaters 76 is mounted rotatably on a shaft 77 having a sleeve 78, with a miter-gear 79 and a pair of governor balls 80, mounted rigidly thereon, and a clutch sleeve 81 slidably keyed thereto and connected to the governor-ball hangers by a pair of rigid links 82, the lower end of the hub of the brake-wheel being formed with a clutch face 83. The miter-gear 79 is rotatively connected to the driven shaft 22 by a miter-gear 90, pulley 92, belt 93 and a pulley 94 upon the driven shaft. The vanes are braced between the spider and flange 44 by a pair of rings 70, 71. In order to facilitate the installation of the motor the tubular shaft 12, cone 45, flange 44, spider rings 46, 47, and bracing rings 70 and 71, are divided and connected as at 75 by any preferred detachable connection (see Fig. 3), the division being so made that the vanes are intact and permanently fixed in the separable parts, thus permitting the shaft 8 to be first mounted in its bearings and the tubular shafts with the turbines to be subsequently set in place.

Assuming for purposes of description the motor to be momentarily in the position shown in Fig. 3, the energy of the wind's impact upon a portion at least of the vanes 38 and 30 at the left side of the axis, is converted into torque transmitted directly to the hollow shaft, whereas the relative angular positions of the exposed vanes 36 and 35 at the right side of the axis deflect the wind and thus reduce to a certain extent the resistance offered thereby to the rotation of the turbine. The wind striking the vanes exposing even the smallest portions of their inside faces is retained and in addition to absorbing the energy due to the impact such vanes convert this volume of the wind into spiral streams having accelerated velocity and project them with considerable force against the vanes 31, 32 and 33 the inwardly curved upper ends of which project these streams in an upward and forward direction against the rear or inner faces of the vanes 34, 35 and 36 of the turbine above and in this manner not only neutralizing but overcoming the resistance of the wind to and exerting torque upon the vanes as they assume the angular positions of those indicated at 34, 35 and 36 in which positions in turbines as heretofore constructed the vanes have retarded rotation. Simultaneously the wind deflected onto the cone from the vanes in front of it is again deflected by the cone onto the vanes at the opposite side of the turbine at an angle to augment the impact force thereon while the wind entering between the vanes and striking the cone is in a like manner deflected onto blades at the opposite side of the turbine, effectively augmenting the impact force. Upon the velocity of the motor and consequently shaft 22 exceeding a predetermined maximum the centrifugal force in the governor will cause the balls 80 to rise and the clutch sleeve 81 to engage the brake wheel which will offer sufficient resistance to retard the motor and reduce its velocity.

What I claim is as follows:—

1. In a turbine the combination with a core of a series of tangential spiral vanes decreasing in width from base to crown and the bases of which extend in width from within close proximity of the circular boundary line of the turbine to within close proximity of the core, such vanes being upwardly diverging and spaced from the core between its ends and inwardly abruptly curved at their upper ends and means connecting the upper and lower ends of the vanes to the core.

2. In a wind motor the combination with a revoluble carrying member of a plurality of turbines rotatively connected to the said member and each comprising an inverted conical core and an annular series of tangentially arranged spiral vanes the bases of which extend in width from within close proximity of the circular boundary line of the turbine to within close proximity of the apex of the cone, and the upper ends thereof being curved abruptly inwardly to the base of the cone; and means securing the said vanes in place.

3. In a turbine the combination with a core of truncated inverted conical form having an encircling flange at its base and a circular spider at its truncated apex, of a series of tangential spiral vanes the bases of which extend in width from within close proximity of the circular boundary line of the turbines to within close proximity of the core, such vanes being upwardly diverging substantially in parallelism with the core and inwardly abruptly curved at their upper ends, means connecting the upper ends of the vanes to the flange, and means connecting the lower ends of the said vanes to the spider.

In testimony whereof I have signed my name to this specification in the presence of two witnesses.

GEORGE D. PEARSON.

Witnesses:
  NORVAL DICKSON,
  E. R. PITTS.